United States Patent
Scherer et al.

(10) Patent No.: US 11,745,474 B2
(45) Date of Patent: Sep. 5, 2023

(54) COMPOSITE GLASS WITH AN INTERMEDIATE FILM THAT CHANGES COLOUR DEPENDING ON THE VIEWING ANGLE

(71) Applicant: GIESECKE+DEVRIENT CURRENCY TECHNOLOGY GMBH, Munich (DE)

(72) Inventors: Maik Rudolf Johann Scherer, Grainau (DE); Raphael Dehmel, Neubeuern (DE); Kai Herrmann Scherer, Munich (DE); Daniel Lenssen, Munich (DE); Michael Rahm, Bad Tolz (DE); Mario Keller, Seebruck (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 197 days.

(21) Appl. No.: 17/273,265

(22) PCT Filed: Sep. 2, 2019

(86) PCT No.: PCT/EP2019/025290
§ 371 (c)(1),
(2) Date: Mar. 3, 2021

(87) PCT Pub. No.: WO2020/048638
PCT Pub. Date: Mar. 12, 2020

(65) Prior Publication Data
US 2021/0339504 A1    Nov. 4, 2021

(30) Foreign Application Priority Data
Sep. 7, 2018 (DE) ..................... 10 2018 007 108.2

(51) Int. Cl.
*B32B 17/10* (2006.01)
*B44F 1/06* (2006.01)
(Continued)

(52) U.S. Cl.
CPC .... *B32B 17/10504* (2013.01); *B32B 17/1022* (2013.01); *B32B 17/10036* (2013.01);
(Continued)

(58) Field of Classification Search
CPC .......... B32B 17/10036; B32B 17/1022; B32B 17/1044; B32B 17/10651; B32B 2250/03;
(Continued)

(56) References Cited

U.S. PATENT DOCUMENTS

| | | |
|---|---|---|
| 4,968,553 A | 11/1990 | Cesar |
| 5,144,459 A | 9/1992 | Felske et al. |

(Continued)

FOREIGN PATENT DOCUMENTS

| | | |
|---|---|---|
| DE | 3546648 C2 | 5/1991 |
| DE | 10050345 C1 | 5/2002 |

(Continued)

OTHER PUBLICATIONS

Search Report and Written Opinion from corresponding German Application No. 10 2018 007 108.2, dated Apr. 17, 2019.
(Continued)

*Primary Examiner* — Ruiyun Zhang
(74) *Attorney, Agent, or Firm* — WORKMAN NYDEGGER

(57) ABSTRACT

A composite glass comprises two glass and/or plastic plates and an intermediate foil arranged between the glass and/or plastic plates. The composite glass, due to the intermediate foil, is configured differently in a side-dependent manner, by appearing to a viewer more transparent from an inner side than from an outer side. The composite glass, due to the
(Continued)

intermediate foil, appears to the viewer different in a viewing angle-dependent manner from the outer side.

24 Claims, 3 Drawing Sheets

(51) Int. Cl.
*B44F 1/10* (2006.01)
*C09B 67/00* (2006.01)
*C09K 19/02* (2006.01)

(52) U.S. Cl.
CPC ............... *B44F 1/066* (2013.01); *B44F 1/10* (2013.01); *C09B 67/0098* (2013.01); *C09K 19/02* (2013.01); *B32B 17/1044* (2013.01); *B32B 17/10651* (2013.01); *B32B 2250/03* (2013.01); *B32B 2307/4026* (2013.01); *B32B 2307/414* (2013.01); *B32B 2307/416* (2013.01); *B32B 2307/42* (2013.01)

(58) Field of Classification Search
CPC ...... B32B 2307/4026; B32B 2307/414; B32B 2307/416; B44F 1/006; B44F 1/10; C09B 67/0098

USPC ......................................................... 428/1.1
See application file for complete search history.

(56) References Cited

U.S. PATENT DOCUMENTS

| | | | |
|---|---|---|---|
| 2009/0169795 | A1 | 7/2009 | Fiechter |
| 2019/0018366 | A1 | 1/2019 | Weber et al. |

FOREIGN PATENT DOCUMENTS

| | | |
|---|---|---|
| DE | 102006057049 A1 | 6/2008 |
| GB | 2165292 A | 4/1986 |
| JP | S6461238 A | 3/1989 |
| JP | 2004307303 A | 11/2004 |
| WO | 2017202517 A1 | 11/2017 |

OTHER PUBLICATIONS

International Search Report and Written Opinion from PCT Application No. PCT/EP2019/025290, dated Dec. 11, 2019.

COMPOSITE GLASS WITH AN INTERMEDIATE FILM THAT CHANGES COLOUR DEPENDING ON THE VIEWING ANGLE

FIELD OF THE INVENTION

The invention relates to a composite glass which, due to an intermediate foil, has an effect different in a side-dependent manner.

BACKGROUND

Composite glass usually comprises two or more glass panes which comprise at least one intermediate foil for increasing the fracture resistance of the composite glass. In particular for building glasswork, composite glass should be reflective from the outside to reduce solar radiation, and semitransparent from inside to enable a view outside. For this purpose, it is known, among other things, to utilize an intermediate foil coated in a different manner on the inside and outside.

There is already composite glass on the market, which comprises a regular pattern—having a semitransparent effect from inside—from opaque intermediate foil pieces. The intermediate foil pieces are coated black on the inside and are designed to be reflective on the outside with a selectable color, for example in a green or blue hue.

The manufacturing of the composite glass already requires a plurality of individual steps. A processing of intermediate foil pieces further increases the manufacturing effort and thus the manufacturing costs.

The following items are already known from other contexts: coated foils which depending on the viewing angle appear in different colors for example and known lacquers with pigments which depending on the viewing angle have a different effect.

SUMMARY

The invention is based on the object of providing a composite glass which is optically attractive to the viewer and which can be produced in particular at low costs.

The composite glass comprises at least two glass and/or plastic plates and an intermediate foil arranged between the glass and/or plastic plates. Due to the intermediate foil, the composite glass is configured differently in a side-dependent manner. Preferably, it is semitransparent from an inner side and reflective from an outer side. In the present case, the composite glass is adapted, due to the intermediate foil, to appear different in a viewing angle-dependent manner from the outer side.

The composite glass is therefore not only visually more attractive to the viewer, but also substantially more versatile. The viewing angle dependence may serve for displaying a motif such as a company logo or information such as text, numbers or direction arrow(s). Likewise, the viewing angle dependence of the composite glass can be adapted to the installation location, for example to the color of the background, such as the surroundings or neighboring buildings, which is different depending on the viewing angle.

The viewing angle dependence is supplied by a relief structure, an interference layer construction or pigments in a pigment layer in the intermediate foil. The composite glass thus becomes configurable without causing additional costs. A viewing angle dependence adapted with regard to, for example, motif, viewing angle or hues does not require a recertification of the composite glass, since only parameters of the relief structure, of the interference layer construction or of the pigment of the intermediate foil are adapted. In particular other substances, further layers or other types of pigments are not required.

The intermediate foil may supply different viewing angle dependencies, where applicable combinable with each other. At a first viewing angle, preferably a first viewing angle range, the composite glass appears to be reflective in a first color hue and at a second viewing angle, preferably a second viewing angle range, it appears to be uncolored—in particular reflective or non-reflective—or reflective in a second color hue. Likewise, a movement, in particular of a motif or of several partial areas, can be represented for the viewer depending on the viewing angle. Thus, a motif such as a company logo or direction arrow may move on a building facade, in particular selectively in the moving direction of a viewer moving in front of the building, against the moving direction of the viewer, orthogonal to the moving direction of the viewer, or with a changing moving direction of the motif in the case of a linear moving direction of the viewer. Instead of a moving motif, partial areas recognizable to the viewer may move (a pattern of partial areas may move all over the area or only within a motif). Likewise or additionally, a motif can be shown or not shown to the viewer depending on the viewing angle. The motif disappears (or appears) at a boundary viewing angle. Analogously, a first (static or moving) motif may change into a second motif depending on the viewing angle (circle=>square). However, it is more complex but likewise conceivable to show a motif in different three-dimensional views in a viewing angle-dependent manner.

In advantageous embodiments, the intermediate foil comprises a partial layer with pigments whose hue depends on the viewing angle. Preferably, the pigments here are aligned uniformly. For example, interference layer pigments can be used which reflect in two different color hues in a viewing angle-dependent manner. The color hues can be selected by means of a partial layer thickness of the interference layer pigments, usually a spacer layer. Alternatively, the intermediate foil comprises a partial layer with liquid crystal pigments whose hue depends on the viewing angle.

The intermediate foil comprises a partial foil layer and further partial layers, such as for example the pigment layer.

Likewise, the intermediate foil may comprise a non-reflective and dark partial layer. This partial layer makes the intermediate foil appear altogether semitransparent from the inner side. It is preferably a semitransparent partial layer, but—in the case of intermediate foils arranged on part of the area—can also be opaque. The semitransparent partial layer is preferably arranged on one—the inside or the outside—surface of a partial foil layer. Particularly preferably, the semitransparent, non-reflective and dark partial layer is configured black and/or matt. It may also serve as a background for a full-area partial layer with liquid crystal pigments.

In further advantageous embodiments, the intermediate foil comprises an interference layer construction. The interference layer construction preferably comprises three (and optionally two or five) partial layers. The thickness of a spacer layer of the interference layer construction will determine a first (and a second) color hue. As a spacer layer, there is preferably used a dielectric partial layer or the partial foil layer of the intermediate foil. Usually, the spacer layer is arranged between two semitransparent, reflective partial layers, which can be formed in particular from a metal or from highly reflective material.

In the composite glass, at least one, preferably exactly two, three or all of the following partial layers of the intermediate foil are configured over the full area: partial foil layer, pigment layer, relief layer, first reflector layer, spacer layer and/or second semitransparent reflector layer.

An opaque partial layer or a matt structure of the intermediate foil, on the other hand, would usually be configured on part of the area in such a way that the composite glass has a semitransparent effect from inside. Alternatively, a semitransparent partial layer of the intermediate foil is configured over the full area so that the composite glass has a semitransparent effect from inside.

In particularly preferred embodiments, the intermediate foil has a relief layer. The relief layer can be an embossed partial layer, in particular the partial foil layer and/or an embossed partial layer, preferably formed by an in particular curable embossing lacquer, may be embossed. The relief layer or the embossing has a coloring effect on the outside, for example when it is formed as a color-filtering subwavelength structure. Alternatively or additionally, the relief layer can create the viewing angle dependence on the outside. The relief layer can here be a lens structure, a concealing structure or a reflector structure, for example. Through each lens of the lens structure, the viewer sees, depending on the viewing angle, either a first or a second motif area, which can be of different colors for example. A concealing relief structure (for example of knobs, pyramids or lines) conceals or reveals the view onto a motif area depending on the viewing angle. Particularly preferably, the relief structure is a reflector structure, where individual reflectors become effective depending on the viewing angle, i.e. reflect in the direction of the viewer. As directional reflectors of the reflector structure there may serve directional plane or bulged areas, Fresnel-like reflectors or lattice-shaped reflector areas. Reflector structures can be utilized in particular for the aforementioned effects of an appearing, changing, three-dimensionally effective or moved motif. In particular for the representation of a color change, the relief structure can be configured on two levels with two partial relief structures, whereby each partial relief structure (or level) reflects in different colors. Alternatively, the relief structure can be configured as a matt structure, in order to design the composite glass to be matt, i.e. non-reflective, and semitransparent on the inside.

The intermediate foil itself may be provided in a gridded manner—regular or irregular —, in particular in a plurality of individual intermediate foil pieces. Alternatively, the intermediate foil can be provided over the full area or in a netlike manner, in particular with a plurality of recesses. A full-area intermediate foil may comprise a plurality of individual pre-foil pieces or a netlike pre-foil, i.e. with a plurality of recesses, on a—preferably transparent—partial foil layer. In the case of a full-area intermediate foil, at least a partial foil layer is present over the full area. The further partial layers may likewise be present over the full area, if they are transparent or semitransparent. In contrast, partial layers or opaque pre-foil pieces which have an opaque effect from inside are only present on part of the area, i.e. in particular in a gridded or netlike manner. The composite glass has the present optically effective intermediate foil. Optionally, it may further comprise at least a mechanically effective foil.

Glass or plastic plates in the present context are rigid and have a minimum thickness of 0.2 mm, preferably a thickness of 0.2 to 15 mm, further preferably 0.2 to 9 mm. Composite glass regularly has a size of more than 0.5 m² and/or is thicker than 10 mm, preferably than 15 mm, further prefer- ably than 20 mm, in particular 10 to 60 mm, preferably 20 to 45 mm thick. Intermediate foils are flexible (not rigid). The thickness of the intermediate foil is preferably at most 150 µm, preferably less than 100 µm, more preferably less than 60 µm.

The composite glass described can be advantageously arranged as a window, such as a building window, vehicle window or other large-area window, in a composite glass holder.

From a plurality of such windows, which are configured similar or different in particular in their viewing angle dependence, for example a building facade can be formed. The viewing angle dependence can be configured—in the same or a in different manner depending on the implementation—to achieve the same viewing angle dependence for the plurality of windows. Alternatively, the plurality of windows can deliberately have different viewing dependencies to form an overall motif.

BRIEF DESCRIPTION OF THE DRAWINGS

With reference to the following figures, preferred embodiments are described in more detail. There are shown FIG. 1 a cross section of a window with composite glass which has an intermediate foil.

DETAILED DESCRIPTION OF VARIOUS EMBODIMENTS

Figure 1:
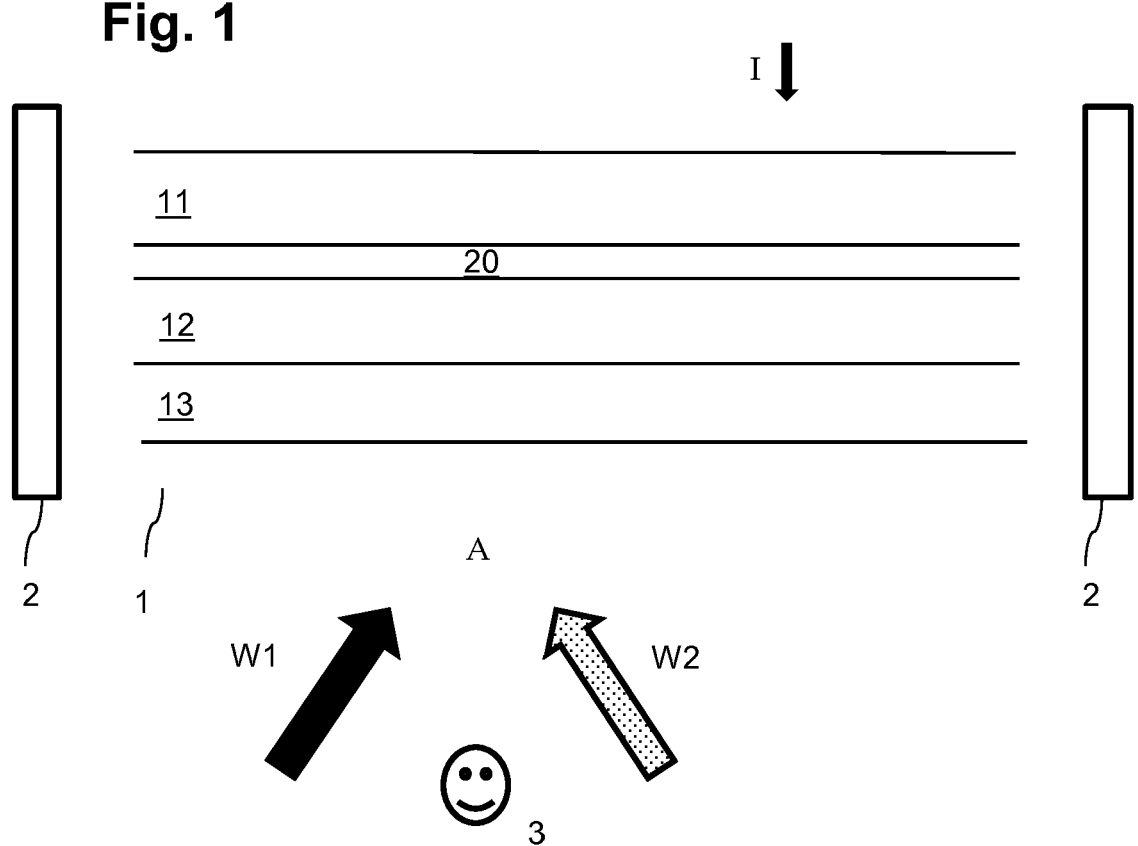

The window in FIG. 1 comprises a composite glass 1 with at least two glass plates 11, 12 and here an optional further glass plate 13 as well as an intermediate foil 20 arranged between the glass plates 11 and 12. The composite glass 1 is arranged in a composite glass holder 2 which can be a window frame, for example.

In the composite glass, in particular between the glass plates 12 and 13, there may be at least one optional further foil layer—not shown —, which is preferably transparent and serves, for example, as a laminating aid or as a mechanically effective foil (such as fracture resistance). The intermediate foil 20, however, is an optically active or effective intermediate foil.

Viewed from its inner side I, the window is semitransparent to a viewer 3 due to the intermediate foil 20. The inner side I of the window also defines an inside surface of the intermediate foil or—if used terminologically—an inner side of the intermediate foil 20. Viewed from its outer side A, the window, due to the intermediate foil 20, is reflective to the viewer 3 and has a different effect depending on the viewing angle. At a first viewing angle W1, the viewer sees a first appearance of the composite glass, for example reflecting blue over the full area or a brightly reflecting motif in front of a darkly reflecting background. At a second viewing angle W2, the viewer sees a second appearance of the composite glass, for example now reflecting green over the full area (instead of blue) or a motif in the blue reflecting area or the bright motif in a different hue, at a different position or no longer. The first or second appearance arises in a viewing angle range, for example W1<0 degrees and W2>=0 degrees, respectively. A vertical view corresponds to 0 degree, FIG. 1 thus shows approximately W1=−30 degrees and W2=+30 degrees.

The composite glass extends over an area of more than 0.5 m². The glass (and/or plastic) plates are rigid. They regularly have a thickness of several mm, for example 0.8 to 9 mm. The intermediate foil 20, however, is flexible (and much thinner). It has a thickness of less than 200 μm, for example 40-80 μm.

Figure 2:
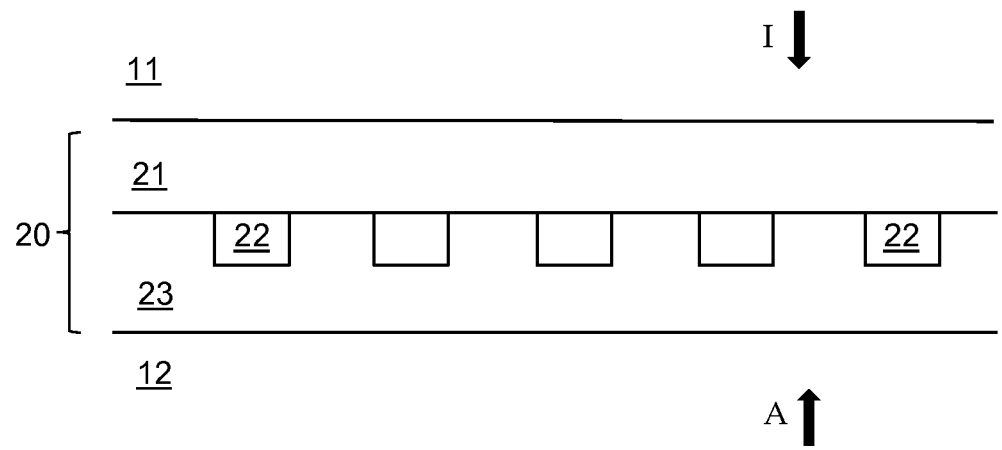
FIG. 2 a cross section of a portion of the composite glass with a first embodiment of an intermediate foil.

FIG. 2 shows in a first variant how the viewing angle dependence and semitransparency are achieved with the aid of the intermediate foil 20.

Between the glass layers 11, 12 there is arranged the intermediate foil 20 with its partial layers 21, 22, 23. A transparent partial foil layer 21 serves as a carrier layer. On the outer side of the partial foil layer 21 (or its outside surface) a black opaque partial layer 22 is arranged in a grid. Due to the opaque partial layer 22 being present only on part of the area, the composite glass is semitransparent from inside.

In the Figure, below the opaque partial layer there is a full-area partial pigment layer 23, whose hue alternates between a first and a second color hue depending on the viewing angle. For example, from a viewing angle range of +/−30 degrees (0 degree corresponds to a vertical viewing) a viewer sees the composite glass reflecting with the first color hue, such as blue, green or . . . . If the viewer now moves out of this viewing angle range, the color hue changes. Beginning with an angle of more than +30 degrees, i.e. in a second viewing angle range (or less than −30 degrees, an optional further viewing angle range), the composite glass reflects to the viewer in the second color hue, such as green, yellow or . . . , respectively. The partial pigment layer comprises, for example, liquid crystal pigments or interference layer pigments. In particular for liquid crystal pigments, the gridded opaque partial layer 22 serves as a background, which makes the (viewing angle-dependent) hue more easily recognizable. Liquid crystal pigments are usually aligned uniformly to create the desired color impression. Interference layer pigments could likewise be aligned uniformly, for example magnetically or by embossing, to make the color impression more distinct.

In embodiments, the pigments of the pigment layer can be aligned. For magnetically alignable pigments, the alignment can be effected by means of a magnetic field, for example. Reflective pigments can therefore be used like directional reflectors. Opaque or reflective pigments can alternatively be aligned in a jalousie-like manner.

It is not represented—but functionally understandable with reference to FIG. 2—that the partial layer 22 having a semitransparent effect could likewise be applied to the inner side of the partial foil layer 21. It should also be mentioned that the partial layer 22 having a semitransparent effect could also be configured as a full-area semitransparent partial layer—on one side or the other.

Figure 3:
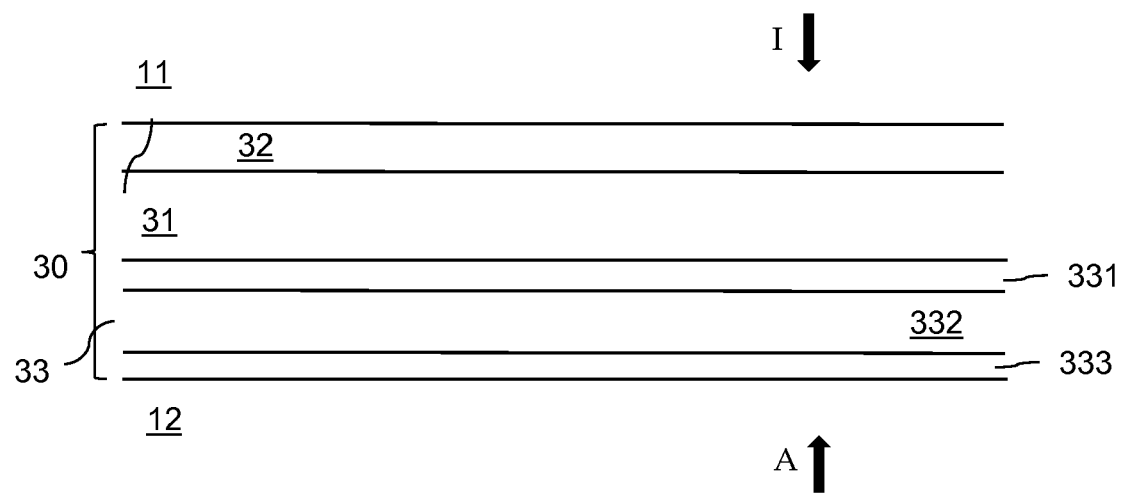
FIG. 3 a cross section of a portion of the composite glass with a second embodiment of an intermediate foil.

FIG. 3 shows such a full-area semitransparent partial layer 32 on an inner side of a partial foil layer 31. Semitransparent partial layers such as the partial layer 32 are preferably dark and matt, i.e. non-reflective. The composite glass thus appears semitransparent to the viewer from inside.

In the embodiment according to FIG. 3, the viewing angle dependence is created by a multilayer construction (or interference layer construction) 33. The multilayer construction 33 is arranged on the outside of the partial foil layer 21. The multilayer construction 33 comprises two semitransparent reflector layers 331 and 333 between which a spacer layer 332 is arranged. The semitransparent reflector layers 331 and 333 can be formed by metal or highly refractive material. The spacer layer 332 is preferably transparent but can optionally comprise a coloring pigment which supports a discrete color change. The thickness of the spacer layer 332 determines the two hues in which the multilayer construction 33 appears reflective depending on the viewing angle. A color change can now be effected, adjusted by the thickness of the spacer layer, starting out from an almost arbitrary first color hue to another (usually no longer freely selectable) color hue. The multilayer construction 33 may comprise further layers, for example a symmetrical five-layer construction with a further spacer layer and a further semitransparent reflector layer or an asymmetrical five-layer construction with two further HRI layers. The multilayer construction 33 or at least one or two of its partial layers 331 and 333 are preferably applied over the full area.

It is conceivable in FIG. 2 or 3 to do without the non-reflective partial layer 22, 32. The partial layer 331 may have a matt effect from inside and a reflective effect from outside—for example by means of a roughened, structured or embossed outer surface of the partial layer 31. Likewise, the partial foil layer 21, 31 may serve as a non-reflective layer. For example, a black-dyed partial foil layer 21, 31 can be used.

In particular metallic layers of the interference layer construction are regularly produced by means of PVD coating. However, an interference layer construction can also be manufactured by means of coextrusion, for example from a sequence of dielectric layers with selectively different refractive indices.

Figure 4:
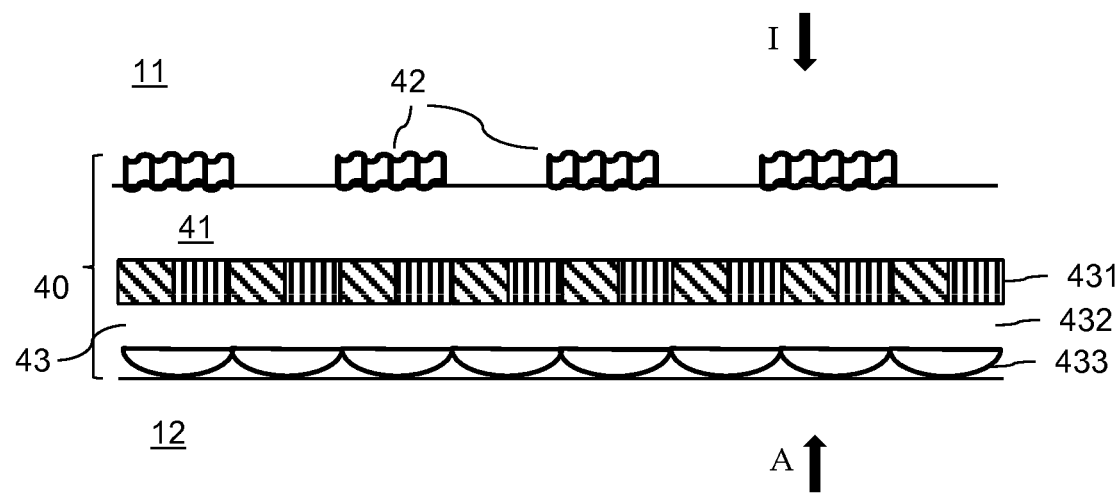
FIG. 4 a cross section of a portion of the composite glass with a third embodiment of an intermediate foil.

FIG. 4 shows an embodiment in which both the semitransparency and the viewing angle dependence are achieved by means of a relief structure.

A non-reflective partial layer 42 of the intermediate foil 40 is formed by an embossed matt structure. The matt structure can be embossed into the inner surface of the partial foil layer or into an additional embossed (lacquer) layer. If the matt structure is opaque, it can be configured on part of the area—as represented in FIG. 4—in order to achieve semitransparency even with a full-area intermediate foil.

The relief structure 43 of the intermediate foil 40 creates the viewing angle dependence. It is arranged on the outside of the partial foil layer. In the represented example, the relief structure is formed by a lens structure 433 and a color layer 431 and optionally an intermediate layer 432 can be provided. The color layer 431 is designed—matched to the lenticular grid—alternately with two different (semitransparent) colors. At negative viewing angles a viewer sees through the lens structure 433 only the first of the two colors and at positive viewing angles only the second of the two colors. The composite glass thus appears, depending on the viewing angle, in the first or the second color hue. It should be noted that the color layer 431 does not have to be present over the full area. Rather, due to the focusing effect of the lens structure, it is sufficient to provide for example 10% of the area with the corresponding color.

As a relief structure, there can analogously be used also a reflector structure. In the example of FIG. 4, mentally, one could simply arrange the color layer and relief layer in a mirrored manner. The viewer sees through the color layer onto directional reflectors which, depending on the viewing angle, show the viewer only one of the two colors. Reflector structures with a plurality of directional reflectors can create—without a spaced color layer—various viewing angle-dependent effects. Substantially, for this purpose, the alignment of the for example plane, directional reflectors is modulated locally in the reflector structure such that a motif appears (flashes up reflectively) only in a particular viewing angle range or moves with the viewing angle (flashes up reflectively at different positions). The details of the mode of function of such relief structures taken alone are sufficiently known in the field of bank notes.

Figure 5:
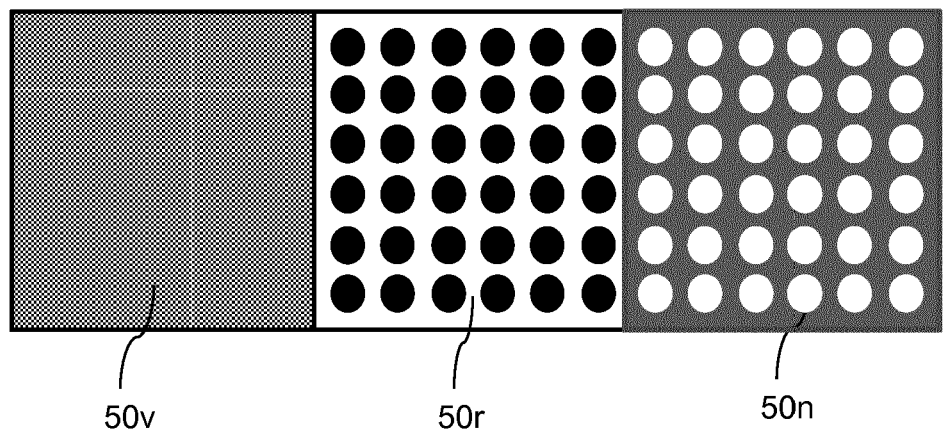
FIG. 5 in top view a full-area, a gridded and a netlike intermediate foil area.

FIG. 5 illustrates, in a top view, variants of how the shown embodiments of the intermediate foil may be present in the composite glass, over the full area or on part of the area, in particular in a gridded or netlike manner. The intermediate foil 50v is semitransparent and can be present over the full area. A plurality of individual intermediate foil pieces 50r or an intermediate foil net 50n are or is present in the composite glass only on part of the area. They can thus also be opaque (or semitransparent) so that the composite glass appears semitransparent from inside. The intermediate foil pieces are preferably configured uniformly and arranged in a grid. The intermediate foil net 50n comprises a plurality of recesses. A plurality of individual, optically viewing angle-dependent (pre-foil) pieces arranged on a transparent partial foil layer can also form a full-area intermediate foil. This full-area intermediate foil in top view would be comparable with the represented plurality of intermediate foil pieces 50r.

In particular in larger window areas, which may also consist of several composite glass windows, the intermediate foil 50v, 50r, 50n as a whole may be provided in the form of a motif (positive viewing angle-dependent motif) or be left out (negative motif with viewing angle-dependent background).

The viewing angle-dependent relief structures may comprise (reflective) Fresnel structures or plane directional micromirrors. The reflector's coating having a reflective effect can either be produced with a PVD metallization of Al, Ag, Au, Cu, AlCu, ZnS or TiN or else printed on with the aid of, in particular nanoscale or platelet-shaped, metal pigments. By an additional application of glazing colors other metallic colors can be supplied. For example, overprinting an aluminum metallization with translucent yellow color results in a golden appearance.

For higher-quality composite glasses, there is even conceivable a combination of the above-mentioned viewing angle-dependent structures. For example, a relief structure having a viewing angle-dependent effect (motif appears or disappears) can be provided with an interference coating (motif changes color—simultaneously or in a further viewing angle range).

A composite glass is manufactured with the steps of supplying the intermediate foil and of a corresponding side-oriented arranging of the intermediate foil between the glass plates.

The intermediate foil is supplied, for example, by producing the viewing angle-dependent structure (pigment layer, interference layer or relief structure) on a black foil or by transferring the viewing angle-dependent structure from an intermediate carrier to the black foil. If the black foil (partial foil layer) is semitransparent, it can be used over the full area in a netlike or gridded manner. For the subsequent use as intermediate foil pieces (directly between the glass plates) or pre-foil pieces (on a partial foil layer and then as intermediate foil between the glass plates), the initial foil can be opaquely (or semitransparent) black.

Subsequently, the black foil with a viewing angle-dependent structure is then punched, lasered or cut into individual (pre-foil pieces or) intermediate foil pieces.

The individual intermediate foil pieces are placed true to side on a glass plate and laminated in between this glass plate and a further glass plate. If, however, the individual pieces are first transferred to a—preferably—transparent partial foil layer, they form pre-foil pieces. The intermediate foil resulting from the partial foil layer and the pre-foil pieces is laminated in between two glass plates true to side.

Large-area dynamic effects on windows or facades can also be realized in the following ways, for example.

Starting out from a plurality of uniform intermediate foil pieces with a predetermined reflector inclination, the azimuth angle (and thus the alignment of the reflector) is controlled when arranging the intermediate foil pieces. Each intermediate foil piece may comprise, for example, a plane reflector with an angle of inclination of e.g. 15 degrees or a plurality of small reflectors with the same angle of inclination, whereby optionally a glazing coloring coating or a color-shift coating can be provided. There thus results a reflector arrangement set up for the desired viewing angle dependence (e.g. motif appears, moves or changes color). The individual reflectors form the pixels of the motif, which determine the effect or motif according to their alignment.

Black is the preferred hue for the inner side, but other, preferably dark, color hues can also be used selectively.

By means of an embodiment whose outer side is analogous to the inner side, it is also conceivable that the composite glass, when viewed from the inner side, likewise appears dependent on the viewing angle.

The invention claimed is:

1. A composite glass comprising:
   a first plate, the first plate being a glass plate or a plastic plate;
   a second plate, the second plate being a glass plate or a plastic plate; and
   an intermediate foil arranged between the first plate and the second plate,
   wherein the composite glass, due to the intermediate foil, is configured in a side-dependent manner by appearing to a viewer more transparent from a first side than viewed from a second side,
   wherein the composite glass, due to the intermediate foil, is configured in an angle-dependent manner from the second side by appearing different from a first angle on the second side than from a second angle on the second side, and
   wherein the intermediate foil comprises an interference layer construction, the interference layer construction comprising at least three sublayers, at least one color hue being determined by the thickness of a spacer layer.

2. The composite glass according to claim 1, wherein the composite glass is semitransparent viewed from the first side and has a reflective effect viewed from the second side.

3. The composite glass according to claim 1, wherein the intermediate foil at a first viewing angle, in a first viewing angle range, shows a first appearance, and at a second viewing angle, in a second viewing angle range, shows a second appearance, including:
   appearing, depending on the viewing angle, either in a first color hue or uncolored or in a second color hue, respectively reflective or non-reflective,
   showing, depending on the viewing angle, a movement of a motif or of several partial areas,
   showing, or not showing, depending on the viewing angle, a motif,
   showing, depending on the viewing angle, a motif in different three-dimensional views, or
   showing, depending on the viewing angle, a first motif or a second motif.

4. The composite glass according to claim 1, wherein the intermediate foil is formed by a plurality of individual intermediate foil pieces.

5. The composite glass according to claim 1, wherein the intermediate foil is present over a full area of the composite glass or in a netlike manner or with a plurality of recesses.

6. The composite glass according to claim 1, wherein at least one, exactly two or all the present ones of the following sublayers of the intermediate foil are configured over a full area in the intermediate foil:
non-reflective partial layer,
partial foil layer,
pigment layer,
relief layer,
first reflector layer,
spacer layer, or
semitransparent reflector layer.

7. The composite glass according to claim 1, wherein the intermediate foil has a semitransparent effect, since
an opaque partial layer or a matt structure of the intermediate foil is configured on part of the area in the intermediate foil, or
a semitransparent partial layer of the intermediate foil is configured over the full area.

8. The composite glass according to claim 1, wherein the intermediate foil comprises a relief layer, including an embossed foil layer or an embossed partial layer with an embossing having a coloring effect on the second side that creates the viewing angle dependence on the second side or has a matt structure effect on the first side.

9. A window comprising:
a composite glass according to claim 1; and
a composite glass holder.

10. The composite glass according to claim 1, wherein first side is an inner side of the composite glass and the second side is an outer side of the composite glass.

11. The composite glass according to claim 1, wherein first side is an outer side of the composite glass and the second side is an inner side of the composite glass.

12. The composite glass according to claim 1, wherein first plate is a glass plate and the second plate is a glass plate.

13. The composite glass according to claim 1, wherein first plate is a plastic plate and the second plate is a plastic plate.

14. The composite glass according to claim 1, wherein first plate is a glass plate and the second plate is a plastic plate.

15. The composite glass according to claim 1, wherein first plate is a plastic plate and the second plate is a glass plate.

16. The composite glass according to claim 1, wherein the intermediate foil is formed by a plurality of individual intermediate foil pieces arranged in a gridded manner.

17. A manufacturing method for a composite glass according to claim 1,
supplying an intermediate foil which appears in a side-dependent manner by appearing to a viewer more transparent from a first side than viewed from a second side,
embedding the intermediate foil between a first plate and a second plate, the first plate being a glass plate or a plastic plate and the second plate being a glass plate or a plastic plate,
wherein the intermediate foil is configured in an angle-dependent manner from the second side by appearing different from a first angle on the second side than from a second angle on the second side, and
wherein the intermediate foil comprises an interference layer construction, the interference layer construction comprising at least three sublayers, at least one color hue being determined by the thickness of a spacer layer.

18. A composite glass comprising:
a first plate, the first plate being a glass plate or a plastic plate;
a second plate, the second plate being a glass plate or a plastic plate; and
an intermediate foil arranged between the first plate and the second plate,
wherein the composite glass, due to the intermediate foil, is configured in a side-dependent manner by appearing to a viewer more transparent from a first side than viewed from a second side,
wherein the composite glass, due to the intermediate foil, is configured in an angle-dependent manner from the second side by appearing different from a first angle on the second side than from a second angle on the second side,
wherein the intermediate foil comprises a relief structure that causes the angle-dependent manner of the composite glass due to the intermediate foil.

19. The composite glass according to claim 18, wherein the intermediate foil comprises an interference layer construction, the interference layer construction comprises at least three sublayers, at least one color hue being determined by the thickness of a spacer layer.

20. The composite glass according to claim 18, wherein the composite glass is semitransparent viewed from the first side and has a reflective effect viewed from the second side.

21. The composite glass according to claim 18, wherein the intermediate foil at a first viewing angle, in a first viewing angle range, shows a first appearance, and at a second viewing angle, in a second viewing angle range, shows a second appearance, including:
appearing, depending on the viewing angle, either in a first color hue or uncolored or in a second color hue, respectively reflective or non-reflective,
showing, depending on the viewing angle, a movement of a motif or of several partial areas,
showing, or not showing, depending on the viewing angle, a motif,
showing, depending on the viewing angle, a motif in different three-dimensional views, or
showing, depending on the viewing angle, a first motif or a second motif.

22. The composite glass according to claim 18, wherein the intermediate foil is formed by a plurality of individual intermediate foil pieces.

23. The composite glass according to claim 18, wherein the intermediate foil is present over a full area of the composite glass or in a netlike manner or with a plurality of recesses.

24. A window comprising:
a composite glass according to claim 18; and
a composite glass holder.

* * * * *